United States Patent [19]

Geier

[11] 4,051,647
[45] Oct. 4, 1977

[54] ROTARY MOWER

[76] Inventor: Horst W. Geier, 18 Hawley Terrace, Yonkers, N.Y. 10606

[21] Appl. No.: 650,843

[22] Filed: Jan. 21, 1976

[51] Int. Cl.² ............................................. A01D 53/08
[52] U.S. Cl. ........................................ 56/13.4; 56/295
[58] Field of Search ................ 56/295, 17.5, 13.4, 56/255

[56] References Cited

U.S. PATENT DOCUMENTS

| 3,690,051 | 9/1972 | Wood | 56/295 |
|---|---|---|---|
| 3,888,072 | 6/1975 | Templeton | 56/320.2 |
| 3,905,182 | 9/1975 | Geier | 56/13.6 |

Primary Examiner—Russell R. Kinsey
Attorney, Agent, or Firm—Spellman & Joel

[57] ABSTRACT

A rotary motor comprises an upper rotating collar section and a lower rotating disc, and mounted between the collar section and the disc a predetermined number of knife blades which are rotatable about their mounting and located toward the collar and disc periphery in a manner to prevent damage when the blade strikes loose stones and the like. The disc also includes an integral, radial, depressible spring strip for each knife blade for quick knife changes, suitable air ducts on its upper surface and at least one radially arranged vane on its underside. The mower further includes a saucer mounted underneath each collar section and disc, at least one predetermined lamination inside each saucer, and a plurality of suction slots or holes around the saucer perimeter to provide a vertical updraft and horizontal suction effect whereby the material being cut by the mower is elevated upwards for cutting purposes and wherein the windrows formed by the drum type mowers are widened in a set manner for more effective conditioning subsequent to mowing.

4 Claims, 3 Drawing Figures

ROTARY MOWER

BACKGROUND OF THE INVENTION

The present invention relates to mowers and particularly to rotary mowers including means for protecting the cutting blades and means for more efficiently and effectively cutting grass and the like by providing an updraft which draws the grass into the path of the blades.

One of the common types of mowers for cutting grass and agricultural crops is the drum or disc mower wherein a plurality of blades are carried in an orbit around a substantially vertical central axis. A serious problem with such mowers is the possibility of damage to the blades which occurs when the blades strike stones or other solid objects.

Another problem encountered by rotary mowers occurs when the grass under the influence of the horizontal air flow generated by the counter rotating mower rotors tends to duck away from the cutting blades and to erect itself behind the mowers, thus leaving an undesirable uncut strip in the center between each pair of the correlated rotors. This problem is extremely troublesome in thin hay.

Various solutions to these problems are disclosed in U.S. Pat. Nos. 3,656,286 and 3,662,529 to Glunk et al., in U.S. Pat. No. 3,507,104 to Kline, et al., U.S. Pat. No. 3,581,482 to Reber, U.S. Pat. No. 3,395,522 to Zweegers, U.S. Pat. No. 3,469,378 to Heesters et al. and French Pat. No. 1,519,808.

Of particular interest is U.S. Pat. No. 3,905,182 to Horst W. Geier. The present invention represents a unique improvement over the rotary mower of the aforementioned patent by the same inventor.

The present novel arrangement differs from the prior art wherein knife blades and knife holders are positioned inside the annular ring gap between a freely rotating or stationary saucer and a rotating collar section or disc. Also, the invention discloses a blower arrangement for generating an updraft to erect the grass in the path of the knife blades.

SUMMARY OF THE INVENTION

As distinguished from the prior art, discussed above, the present invention relates to a new and improved rotary type mower which provides greater protection for the mower rotors, cutting knives and knife fasteners and simultaneously generates an intensive updraft to avoid uncut hay strips between correlated counter-rotating rotors and also eliminates any plugging of the built-in air ducts particularly in thin hay stands.

A rotary mower comprises a covering disc or collar section which is either substantially level, or continuously downwardly sloped over its entire depth, having a predetermined number of blades mounted thereabout at spaced intervals. The blades are secured in a circular housing space formed by the covering disc or collar section and a lower multi-functional disc of substantially the same diameter as the covering disc or collar section in such a manner as to permit a complete or partial rotation of the knife blade when it strikes stones or the like.

The lower multi-functional disc includes an integral radial spring strip for each knife blade which is preferably lanced out of the same disc material and arranged flush with the disc periphery and upper surface in order to avoid any exposed corners which may collide with stones or any other hard objects.

Each knife blade is pivoted between the covering disc or collar section and the respective lower disc strip with a suitable bolt or pin, which may be mounted in the rim section of the covering disc or collar element above the spring strip in the disc, or at the end of the spring strip itself. For grearter rigidity of the knife pivot bolt or pin arrangement, the free bolt or pin end engages a registering hole in the coordinated surface area above or underneath the element to which the knife bolt or pin is mounted. Knife changes thus merely require a downward deflection of the spring strip with a suitable lever device.

Underneath the covering disc or collar section and the lower multifunctional disc, which are all driven and rotating elements, a stationary or freely rotatable saucer of a slightly larger diameter than the rotating disc members above is arranged concentrically with the rotating disc members in such fashion that the upwardly curved saucer rim lies substantially in the same plane as the upper surface of the peripheral section of the spring disc.

The desired updraft of the mower is achieved through the cooperation of at least one air intake hole or scoop on the disc located on the upper surface and toward the center of the said spring disc, at least one fan blade on the underside of the same spring disc, and at least one predetermined stationary deflector lamination on the inside and toward the periphery of the non-rotating saucer.

The blower disc may be provided with an upwardly curved radius about its perimeter which in conjunction with the upwardly curved rim section of the saucer is designed to deflect the exhaust air stream moving between the blower disc and the saucer inside into a substantially vertical circular updraft whereby the material being cut by the mower is elevated upright for cutting purposes.

The strong circular upwardly directed air stream generated around each disc or collar section is also intended to counteract the horizontal air flow between counter rotating rotors, which causes thin hay to duck away from the cutting knives in the center area between two adjacent rotors.

Intermittent suction slots or holes may be provided around the saucer periphery in order to aid in the erection of layed hay through an additional horizontal Venturi or suction effect generated by the air exhaust between the coordinated blower disc and saucer peripheries.

A substantial simplification of the above described mower system is feasible by omitting the covering disc or collar section entirely. Such an arrangement, however, would require a suitable protective housing for the knife blades and effective means to protect the air ducts from plugging.

Accordingly, it is an object of this invention to provide a new and improved rotary type mower.

It is another object of this invention to provide a new and improved rotary mower including unique means for protecting the knives and knife holders and changing the knife blades more quickly on said mower.

A further object of this invention is to provide a new and improved mower causing a strong updraft whreby the material being cut is forced into the path of the blades without plugging the air ducts of the mower under any haying conditions.

A more specific object of this invention is to provide a new and improved mower featuring a predetermined number of rotatable knife blades mounted to a rotary body, a blade fastening system which permits faster knife changes with less effort and which is better protected against collision with solid objects, and a non-plugging blower type arrangement devised in order to provide for a more uniform cut by erecting the grass in the path of the knife blades at all times.

BRIEF DESCRIPTION OF THE DRAWINGS

Other objects and advantages of the present application may be more clearly seen when viewed in conjunction with the accompanying drawings wherein.

DETAILED DESCRIPTION OF THE DRAWINGS

Figure 1:
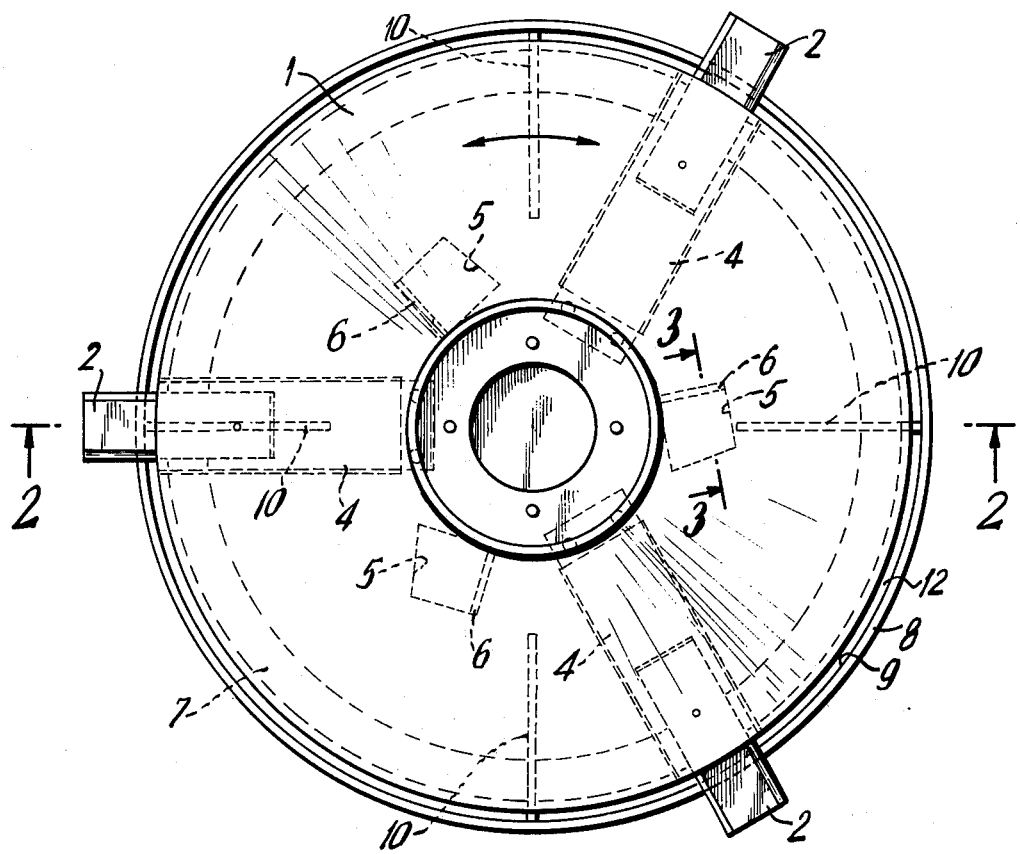
FIG. 1 is a top view of one of the mower rotor units with saucer.
Figure 2:
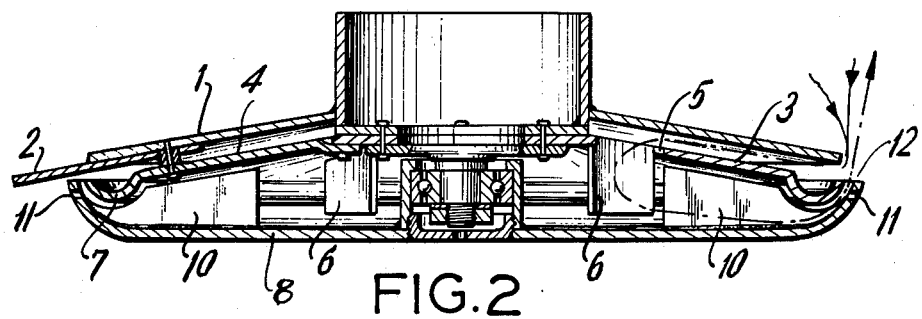
FIG. 2 is a cross-sectional view taken along the line 2—2 of FIG. 1.

Referring now to FIGS. 1 and 2 of the drawings, the invention relates to a new and improved rotary mower comprising one or more coordinated collar sections 1 and disc elements 3 driven by appropriate means and having any selected number of cutting blades 2 associated therewith around the periphery of the collar 1 and disc 3. Further details of the mower drive are conventional and are shown in the prior art mentioned previously.

The covering collar section 1 is level or gently inclined downward toward its periphery. Underneath the collar section 1 and at a predetermined distance from it is a level or gently inclined disc 3 of a similar diameter which is preferably mounted parallel to the collar section 1 and at a spaced distance underneath it.

The disc 3 is preferably made of spring steel and includes a selected number of radial knife support strips or portion 4 extending outwardly from a predetermined point near its inner diameter toward its periphery and a selected number of air intake apertures 5 in the disc and a selected number of blower vanes 6 on its underside. The spring strips 4 are of a predetermined width and thickness to provide the necessary clamping pressure for the knife blades 2 which are fastened to the outer ends of the spring strips 4 in a freely pivoting condition with appropriate pins or bolts which may slidingly engage a register hole in the collar section 1 above. Conversely, a pivot bolt may be fixed to the collar section 1 extending therefrom downwardly through corresponding apertures in the knife and knife supporting spring strip 4.

With this design, a knife change can be readily made by merely depressing the associated knife support strip 4 in the spring disc 3 at a point near the pivot point of the knife blade 2 with a suitable lever device. The integral design of the knife supporting strips 4 assures that they are flush with the surface and perimeter of the spring disc 3 and that the spring strips 4 are now better protected against dislocation when colliding with stones. The possibility of dislocation is minimized by the fact that the peripheral section of the disc 3 is on substantially the same level as the upturned rim of the saucer 8. At the same time, the knives 2 are safely protected in the annular housing between the collar section 1 and the spring disc 3.

The integral air intake apertures 5 and exhaust vanes 6 permit the blower disc 3 to be used for clockwise and counter-clockwise operation. The use of intake air scoops in lieu of air intake holes 5 would necessitate a distinction between left and right hand blower discs 3 in a rotary mower having a plurality of counter-rotating elements.

Figure 3:
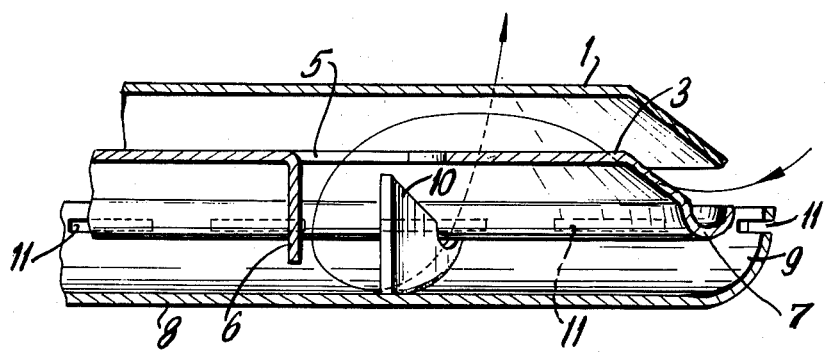
FIG. 3 is an enlarged view taken along the line 3—3 of FIG. 1.

Around its periphery, the blower disc 3 includes, as another integral feature, a concave annular radius 7 which is designed to assist in deflecting the escaping air stream into an upward direction. The desired updraft is achieved in cooperation with the slightly larger stationary or freely rotatable saucer 8 by utilizing its upcurved peripheral section 9 as the bottom half of an annular, upwardly directed jet, of which the annular radius 7 of the blower disc 3 forms the upper half. The saucer is also equipped with a predetermined number of radial deflector laminations 10 located on its inside and and toward its perimeter for the purpose of steadying the rotation air exhaust flow generated by the blower disc 3. The saucer 8 may also be provided with intermittent suction slots or holes 11 (FIG. 3) around its periphery in order to generate an additional suction effect caused by the upwardly scaping circular jet stream (Venturi Effect).

The upwardly directed exhaust air flow also tends to counteract the horizontal air stream generated between counter-rotating rotors which is the cause of uncut center strips in thin hay crops. The air intake flow also provides a desirable coolant for the mower bearings.

By making the distance between the collar section 1 and blower disc 3 sufficiently large in comparison to the annular gap 12 between the blower disc 7 and saucer periphery 9, the exhaust air velocity will be greater than the air intake speed and thus form a protective air curtain around the mower which will prevent grass and dirt from entering the air intake ducts.

Furthermore, with the above arrangement the intake air flow can be utilized in order to force the escaping air stream into a more erect draft pattern. Past experience has shown that previous art of generating an updraft have failed because of constant congestion of the air intake ducts. The present invention proposes a solution to this problem.

While the invention has been explained by a detailed description of certain specific embodiments, it is understood that various modifications and substitutions can be made in any of them within the scope of the appended claims which are intended also to include equivalents of such embodiments.

What is claimed is:

1. In a rotary mower, the combination comprising:
   a mower body rotatable about a generally vertical axis, including a generally vertical cylinder in the center thereof,
   a collar portion fixed to the bottom of said cylinder,
   a blower disc mounted underneath the collar section at a predetermined distance therefrom to form an air intake gap and having a selected number of knife blades mounted thereto, said knife blades being rotatable about their mounting upon striking an object and said mountings being protected by the circular configuration of the housing formed between the collar section and the knife supporting blower disc, and,
   a freely rotatable protective saucer of a slightly larger diameter than the collar section and blower disc, said saucer being mounted to the mower cylinder at the lower end thereof, the rim of said saucer being substantially at the same level as the blower disc periphery and forming an annular exhaust gap with said disc of a smaller distance than the air intake gap to increase the exhaust air velocity in an upward direction forming a protective air stream about the mower.

2. A rotary mower in accordance with claim 1 wherein:
the blower disc includes at least one air intake aperture on its upper surface and at least one exhaust vane arranged on its bottom surface extending downwardly from the aperture, said air intake aperture and exhaust vane being located near the center of the blower disc to direct the flow of air towards the annular exhaust gap, and,
the protective saucer includes an upwardly curved peripheral rim and at least one stationary air deflector lamination extending upwardly from the surface of the saucer to direct the flow of air between the saucer and the disc.

3. A rotary mower in accordance with claim 1 wherein:
the blower disc is provided with an upwardly curved convex radius around its entire periphery such that its outside convex curvature forms an upward circular exhaust jet in conjunction with the inside concave curvature of the saucer periphery.

4. A rotary mower in accordance with claim 1 wherein:
the saucer includes an upwardly curved rim having at least one aperture extending therethrough for the purpose of generating an additional horizontal air suction in conjunction with the upwardly directed exhaust air stream passing through the circular jet configuration formed by the blower disc and saucer peripheries, said jet forming a protective curtain about the mower to prevent foreign matter from entering the air intake.

* * * * *